United States Patent [19]
Inoue et al.

[11] 3,745,340
[45] July 10, 1973

[54] APPARATUS FOR MEASURING THE SULFUR CONTENT OF HYDROCARBONS

[75] Inventors: Yuichiro Inoue, Mitaka-shi, Tokyo-to; Masamichi Sakaki, Minamitame-gun, Tokyo-to; Teruo Fukabori, Kawasaki-shi, Kanagawa, all of Japan

[73] Assignee: Tokyo Shibaura Electric Co., Ltd., Kawasaki, Japan

[22] Filed: Nov. 30, 1971

[21] Appl. No.: 203,354

[52] U.S. Cl. .................... 250/43.5 MR, 250/83.3 R
[51] Int. Cl. ......................................... G01n 23/12
[58] Field of Search .............. 250/43.5 D, 43.5 MR, 250/71.5 R, 83.3 R

[56] References Cited
UNITED STATES PATENTS
3,602,711   8/1971   Arora et al. .................. 250/43.5 D

*Primary Examiner*—James W. Lawrence
*Assistant Examiner*—Davis L. Willis
*Attorney*—Norman F. Oblon, Marvin J. Spivak et al.

[57] ABSTRACT

An apparatus for measuring the sulfur content of hydrocarbons by detecting the dose of gamma-rays which penetrate through a hydrocarbon whose sulfur content is to be determined. A first counting means is provided for counting the dose of gamma-rays which penetrates through the hydrocarbon whose sulfur content is to be measured, a second counting means for counting the number of pulses which have a constant period which are generated from a pulse generator and a display means which directly displays the sulfur content of the hydrocarbon.

The first counting means and the second counting means both begin to count simultaneously and both stop simultaneously when the value counted by the first counting means reaches a preset value which is required to display the sulfur content of the hydrocarbon to be measured with n decimal figures of accuracy. The sulfur content is provided by the count in the second counter and is displayed by the display means to thereby enable the sulfur content to be directly read.

6 Claims, 4 Drawing Figures

Patented July 10, 1973

3,745,340

INVENTORS
YUICHIRO INOUE
MASAMICHI SAKAKI
TERUO FUKABORI

BY Oblon, Fisher, Spivak & McClelland
ATTORNEYS

APPARATUS FOR MEASURING THE SULFUR CONTENT OF HYDROCARBONS

BACKGROUND OF THE INVENTION

1. Field of the Invention

This invention generally relates to an apparatus for measuring the sulfur content of hydrocarbons and more particularly to an apparatus which is capable of easily measuring the sulfur content of hydrocarbons by utilizing gamma-rays emitted from a radioactive source.

2. Description of the Prior Art

In the past, several methods have been proposed for measuring the sulfur content of hydrocarbons, such for example as in heavy or crude oil. Thus, for example, the so-called "burning method" and a method which utilized the bremsstrahlung radiation emitted from $^3$H-Ti have been proposed. It was found that the former burning method required a long analyzing time and took a great deal of skill to implement. In addition, in the latter method, since the absorption coefficient of the radiation, gamma-rays, of the carbon C and the hydrogen H were different from each other, the resultant sulfur content detected in the hydrocarbons had to be corrected in response to the ratio C/H for every different composition of hydrocarbons. In an attempt to overcome the above disadvantages, the so-called "gamma-rays method" was proposed. According to this method, low energy gamma-rays of about 21 Kev are emitted from a radioisotope and are directed upon a hydrocarbon whose sulfur content is to be measured. A radiation detector is then used to detect the dose or portion of gamma-rays which penetrats through the hydrocarbon. The sulfur content of the hydrocarbon can be determined by the degree of absorption of the gamma-rays in the hydrocarbon. When gamma-rays having a low energy of about 21 Kev penetrate the hydrocarbon, the absorption coefficient of the sulfur is larger than the carbon or the hydrogen and the absorption coefficient of the carbon and hydrogen becomes substantially equal, so that it is not necessary to make correction in the ratio C/H for various composition hydrocarbons. For this reason, the gamma-rays method has been found to be particularly useful for measuring the sulfur content of many kinds of hydrocarbons whose composition are different. While somewhat satisfactory, with the gamma-rays method it is necessary to determine the sulfur content of the hydrocarbons by calculating the quantity of gamma-rays which penetrates through a particular hydrocarbon in accordance with a predetermined equation or by applying the penetrated gamma-rays to a predetermined calibration curve and then reading the sulfur content from the curve.

The problem in determining the sulfur content as described above is that such calculations and curve readings are extremely troublesome and inconvenient. Moreover, the sulfur content measurement may be somewhat inaccurate and different results may be produced depending upon the abilities of the individual observer.

SUMMARY OF THE INVENTION

Accordingly, it is a primary object of this invention to provide a new and improved unique apparatus which is capable of easily measuring the sulfur content of hydrocarbons with great accuracy.

Another object of this invention is to provide a new and improved unique apparatus which is capable of automatically and directly determining and displaying the sulfur content of hydrocarbons.

Yet a further object of this invention is to provide a new and improved unique apparatus for measuring the sulfur content of hydrocarbons which is of a simple and compact construction and which functions rapidly.

Briefly, in accordance with the present invention the foregoing and other objects are attained by the provision of an apparatus for measuring the sulfur content of hydrocarbons by detecting the dose or portion of gamma-rays which penetrates through a hydrocarbon to be measured after being emitted from a radiation source. A first counting means is provided for counting the dose of gamma-rays which have penetrated through the hydrocarbon, a second counting means is provided for counting the number of pulses which have a constant period that are generated from a pulse generator, and means are provided for directly displaying the sulfur content of the hydrocarbon to be measured. The above is accomplished in accordance with gating means which enables the second counting means to count the constant period pulses until the first counting means counts the dose or portion of gamma-rays which have penetrated through the hydrocarbon to be measured up to a calculated value which corresponds to a time which has been preset in the first counting means in accordance with a standard hydrocarbon whose sulfur content is known in order to obtain the sulfur content of the hydrocarbon to be measured with n decimal figures of accuracy. In this manner the sulfur content of the hydrocarbon to be measured is directly displayed on the display means by substracting a value which relates to the above preset time from the value of the second counting means at the time that both counters are simultaneously stopped.

BRIEF DESCRIPTION OF THE DRAWINGS

A more complete appreciation of the invention will be obtained as the same becomes better understood by reference to the following detailed description when considered in connection with the accompanying drawings wherein.

DETAILED DESCRIPTION OF THE PREFERRED EMBODIMENTS

The measuring apparatus of the present invention for measuring the sulfur content of hydrocarbons will now be described with reference to FIGS. 1 through 4.

Figure 1:
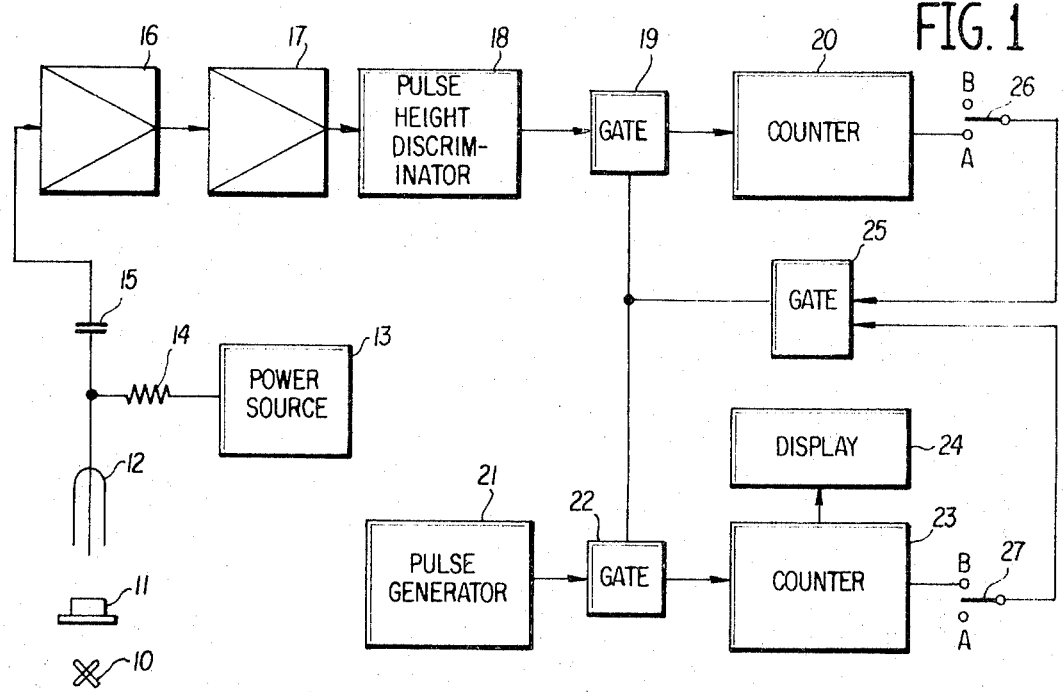
FIG. 1 shows a block diagram of the sulfur content measuring apparatus according to a preferred embodiment of this invention.

Referring now to the FIG. 1, a radioactive source 10, such for example as Americium, $^{241}$Am, is shown and the same emits gamma-rays having an energy of about 21 Kev. A vessel 11 which may accomodate a constant volume of a hydrocarbon to be measured is placed in the path of the gamma-rays emitted from the radioactive source 10. The hydrocarbon to be measured may be, for example, a heavy oil or a crude oil which consists essentially of hydrogen and carbon, and usually includes sulfur as an impurity therein. As is well known, a portion of or dose the gamma-rays emitted from the radioactive source 10 will penetrate through the hydrocarbon within the vessel 11 and a portion or dose of gamma-rays will be absorbed by the carbon, hydrogen and sulfur in the hydrocarbon within the vessel 11 in accordance with the absorption coefficient thereof. The penetrated portion or dose of the gamma-rays which passes through the hydrocarbon within the vessel 11 will then pass to a radioactive detector 12 such as a conventional Geiger-Muller counter whereby the same are converted into corresponding electrical signals. Since the principles of operation of the Geiger-Muller counter are well known in the art, they will not be discussed in detail and it is sufficient for an understanding of the present invention to understand that a high voltage is applied to the detector 12 by a power source 13 through a resistor 14 and that when the gamma-rays reach the detector a discharge will occur so as to emit pulses therefrom in response to the portion or dose of gamma-rays which penetrated through the hydrocarbon within the vessel 11.

The pulse output signals emitted from the detector 12 are fed to an input of a conventional pre-amplifier 16 through a capacitor 15. In order to linearly amplify the pulse output signals of the pre-amplifier 16, a linear amplifier 17 is provided and is connected to the output of the pre-amplifier 16. The pulse output signals from the linear amplifier 17 are then fed to an input of a conventional pulse height discriminator 18 which serves to allow only those pulses above a predetermined pulse height or a predetermined range of pulse heights to pass therethrough. With the provision of the pulse height discriminator 18 it is possible to eliminate any low level or undesired signals, such as noise, and to thereby raise the signal to noise ratio S/N. It should be understood that the invention is not limited to the use of a pulse height discriminator and that alternatively the linear amplifier 17 could, if desired, be provided with a noise discriminate level.

The output signals from the pulse height discriminator 18 will have a constant pulse height and will be applied to a first counting means 20 through a gate 19. The first counting means 20 will be described in more detail hereinafter in connection with FIG. 2. Additionally, a pulse generator 21, which generates pulses having a constant period, is provided and the pulses so generated are applied to a second counting means 23 through a second gate 22. The details of the second counting means 23 will be described hereinafter in connection with FIG. 3. The output of the second counting means 23 is applied to a conventional display means 24, whereby the value of the contents therein is displayed. The display means 24 may be, for example, of the displaying tube or photodiode type. The first counting means 20 is connected through a first switch means 26, which has two terminals A and B to a gate control means 25 which may for example be a conventional flip-flop circuit. In the same manner, the second counting means 23 is connected through a second switch means 27, which has two terminals A and B, to the gate control means 25. The gate control means 25 will function to set the first gate 19 and the second gate 22, to an ON or OFF state thereof in accordance with the receipt of a proper timing pulse from either the first counting means 20 or the second counting means 23. In particular and as explained in more detail hereinafter with reference to FIGS. 2 and 3, if the first switch means 26 and the second switch means 27 are in the A position, then the gate control means 25 will close the first gate 19 and the second gate 22 when the value of the first counting means 20 reaches a predetermined and preset value therein. On the other hand, if the first switch means 26 and the second switch means 27 are in the B position, then the gate control means 25 will close the first gate 19 and the second gate 22 when the value of the second counting means 23 which is indicated by the display means 24 reaches a predetermined and preset value therein. It should now be understood from the above that if the first switch means 26 and the second switch means 27 are set in the A position then a preset counting will be carried out with the time required to reach the preset value set in the first counter 20 being indicated on the display means 24. On the other hand, if the first switch means 26 and the second switch means 27 are respectively set in the B position then a preset counting will be carried out with the time required to reach the preset value set in the second counting means 23 being held in the first counting means 20.

The details of the first counting means 20 and the second counting means 23 will now be described. It should be understood that the counting means 20 and 23 are conventional in the art and may take any desired form. One example of a suitable counting means 20 and 23 will be respectively described with reference to FIGS. 2 and 3.

Figure 2:
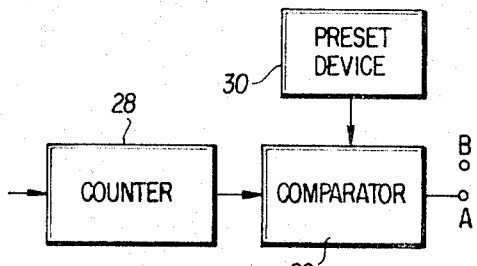
FIG. 2 is a detailed block diagram of the first counting means shown in FIG. 1.

In FIG. 2 the first counting means 20 is shown as including a counter 28 such as of the binary type which serves to count the number of pulses which eminate from the pulse height discriminator 18, and which are applied to the first gate 19. The output terminal of the counter 28 is connected to a comparator 29 where the value thereof and a value preset within a preset device 30 are compared. When the value of the counter 28 coincides with that within the preset device 30 the comparator 29 will generate a timing pulse for switching the gate control means 25 through the terminal A of the first switch means 26.

Figure 3:
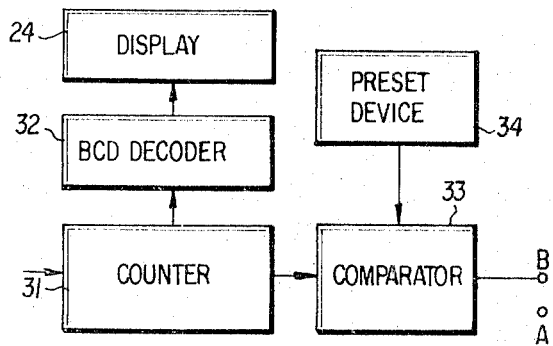
FIG. 3 is a detailed block diagram of the second counting means shown in FIG. 2; and, FIG. 4 is a diagram showing the relationship of the sulfur content in hydrocarbon versus the ratio of the time required to count up to a predetermined or preset value for a standard heavy or crude oil to the time required to count up to a predetermined or preset value for a sample heavy or crude oil to be measured.

In FIG. 3, the second counting means 23 is shown as including a counter 31 such as of the binary type which is connected to the second gate 22 and which serves to count the number of pulses having a constant period which eminate from the pulse generator 21. The output terminal of the counter 31 is connected to a binary-coded-decimal decoder 32 such that the value of the second counter which is binary is converted to a corresponding decimal number. The decimal number so obtained is indicated or displayed by the display means 24. At the same time, the output from the counter 31 is fed to a comparator 33 such that the value of the counter 31, that is, the time determined by the value of the counter 31 and a value of time preset within a preset device 34 are compared. When the value of the counter 31 coincides with the value within the preset device 34 the comparator 33 will generate a timing pulse to thereby switch the gate control means 25 through the terminal B of the second switch means 27. It should be apparrant that if it is desired to read the value of the counter 28, a display means may be provided through a binary-coded-decimal decoder in a manner similar to that described for second counting means 23 shown in FIG. 3.

It should be understood that while the above embodiment of the present invention has been described with reference to $^{241}$Am as the radioactive source, the invention is not so limited and may include any other source that emits gamma-rays having a low energy of about 21 Kev, especially in the range of $21 \pm 8$ Kev. Thus, for example, Promethium (Pm) can also be used. However, when using Promethium it has been found beneficial to obtain gamma-rays that eminate from a Zirconium target by bombarding the same with the beta rays which are emitted from the Promethium source. In the present invention, the energy of the gamma-rays is required to be substantially within the range of 13 Kev to 29 Kev. The energy of substantially 21 Kev has been found to be most convenient because the absorption coefficient of the combined carbon and hydrogen is substantially equal to that of the hydrocarbons and thus it is not necessary to correct for the affect of the carbon and hydrogen in the mixture. However, in practice the range of $\pm 8$ Kev with respect to the preferred 21 Kev level may be allowed since such a deviation will not cause any harmful errors to occur in practice.

Figure 4:
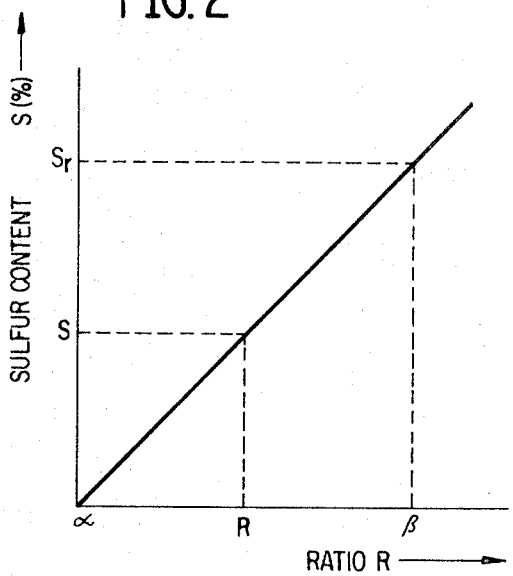

Referring now to FIG. 4, a diagram is shown which represents the relationship between the sulfur content in sample heavy or crude oil and a ratio R. The abscissa which represents the ratio R can be calculated from the following equation.

$$R = {}^tH/{}^ts \quad (1)$$

where the symbols are as follows.

$^tH$ = the time required to count up to a predetermined or preset value according to a plurality of samples of heavy or crude oil whose sulfur content is already known, and wherein the time is determined according to the preset counting system of the present invention by presetting the predetermined or preset value in the first counting means 20 of FIG. 1.

$^ts$ = the time required to count up to a predetermined or preset value according to a standard heavy or crude oil whose sulfur content is already known, and the time is determined according to the preset counting system of the present invention by presetting the predetermined or preset value in the second counting means 23 of FIG. 1.

The ordinate of FIG. 4 shows the sulfur content of sample heavy or crude oil. $\alpha$ denotes the value of $R$ when the sulfur content S is zero percent. $\beta$ denotes the value of the $R$ when the sulfur content S is Sr percent.

Now, as is clearly seen from FIG. 4, a linear relationship is established between the ratio $R$ and the sulfur content S of a sample heavy or crude oil. This relationship may be applied to all hydrocarbons. In accordance therewith, the sulfur content S can be expressed by the following equation.

$$S = (R - \alpha) \cdot Sr/\beta - \alpha \quad (2)$$

From equations (1) and (2) above, the following equation (3) can be obtained.

$$S = \frac{\frac{t_H - \alpha t_s}{t_s}}{\frac{\beta - \alpha}{S_r}} \quad (3)$$

It can be clearly understood from the equation (3) that by substituting $10^{n-1}$ for the denominator of the equation (3) in order to obtain the sulfur content to be measured with n decimal figures of accuracy and that by subtracting the value $\alpha t_s$ which relates to the time required to count up to a predetermined or preset value in accordance with the standard heavy or crude oil from the time $t_H$ required to count up to a predetermined or preset value in accordance with the sample hydrocarbon, whose sulfur content is to be measured, such for example heavy or crude oil, that the sulfur content of the sample hydrocarbon can be readily obtained by directly reading the numerical value of the display means 24 of FIG. 1.

The time $t_s$ required to obtain the sulfur content of a sample hydrocarbon to be measured with n decimal figures of accuracy is expressed by the following equation (4):

$$t_s = [S_r/(\beta - \alpha)] \cdot 10^{n-1} \quad (4)$$

Since the values $S_r$, $\beta$ and $\alpha$ can be easily obtained from the predetermined curve diagram shown in FIG. 4, the value of $t_s$ may also be easily determined.

After determining the time $t_s$ in accordance with the above, the counted value of gamma-rays K, which corresponds to the time $t_s$ can be determined by the preset time system of the present invention. That is, at first the time $t_s$ is preset in the second counting means 23 and the switching means 26 and 27 are set to the B position. The number of gamma-rays K which penetrate through the standard hydrocarbon, such for example, heavy or crude oil are then counted within the preset time and thereby established by the first counting means 20. After initially obtaining the time $t_s$ and the counted value of gamma-rays K, the measuring of the sulfur content in a sample hydrocarbon can be realized as follows with reference to FIG. 1.

First, the value of gamma-rays K is preset in the first counting means 20. The value which corresponds to $-\alpha t_s$ that is, the complement of the value $\alpha t_s$ is then preset in the second counting means 23. The number of gamma-rays which penetrates through the sample heavy or crude oil to be measured, which is placed in the vessel 11, is then counted by the first counting means 20. Simultaneously, the pulse generator 21 is started and the number of pulses generated from the pulse generator 21 are counted by the second counting means 23. When the value of the gamma-rays counted by the first counting means 20 reaches the preset value of gamma-rays K, the first counting means 29 will generate a timing pulse which is then fed to the gate control means 25. Upon receiving the timing pulse, the gate control means 25 will close the first gate 19 and the second gate 22 to thereby stop the counting action of the first means 20 and the second counting means 23. At such time, the value counted by the second counting means 23 will indicate the value $(t_H - \alpha t_s) \cdot 10^{(n-1)}$ which represents the sulfur content of the sample heavy or crude oil to be measured. Since this value $(t_H - \alpha t_s) \cdot 10^{(n-1)}$ is indicated or displayed by the display means 24, the value of sulfur content can be directly and immediately read.

It should now be apparant that the present invention as described hereinabove provides a compact apparatus suitable for measuring the sulfur content in hydrocarbons more accurately, easily and quickly than heretofor was possible. Moreover, it should now be apparant that the present invention is very advantageous in that sulfur content can be read directly without the necessity of correcting for the affect of C/H, having to calculate in accordance with a predetermined equation or having to apply the penetrated gamma-rays to a calibration curve.

Obviously, numerous modifications and variations of the present invention are possible in light of the above teachings. For example, while in the above described embodiment, the complement of the value $\alpha t_s$ is initially preset in the second counting means 23 in order to enable a subtraction of the value relating to the predetermined or preset time $\alpha t$, the invention is not so limited and a subtracting circuit may be provided for subtracting the value $\alpha t_s$. Such a subtracting circuit may be provided between the second counting means 23 and the display means 24 and may be of any desired type well-known in the art.

Moreover while the foregoing embodiment of the present invention described the situation wherein the hydrocarbon was assumed to be a heavy or crude oil, the invention is not so limited and is applicable to any other hydrocarbons which include hydrogen and carbon.

It is therefore to be understood that within the scope of the appended claims the invention may be practiced otherwise than as specifically described herein.

What is claimed as new and desired to be secured by LETTERS PATENT of the UNITED STATES is:

1. An apparatus for measuring the sulfur content of hydrocarbons comprising:
   a radiation source for directing gamma-rays upon a hydrocarbon the sulfur content of which is to be measured;
   a first counting means for counting the portion of gamma-rays which have penetrated through said hydrocarbon, said first counting means counting up to a value which corresponds to a predetermined time which has been preset in said first counting means in accordance with a standard hydrocarbon whose sulfur content is known in order to obtain the sulfur content of the hydrocarbon to be measured with n figures of accuracy;
   a pulse generator for emitting pulses having a constant period;
   a second counting means for counting the pulses emitted from said pulse generator, said second counting means counting until said first counting means reaches said predetermined value and includes means for subtracting a value which relates to said predetermined time;
   display means coupled to said second counting means for directly displaying the sulfur content of the hydrocarbon to be measured as provided by said second counting means when said second counter has counted until said first counting means has reached said predetermined value and has subtracted a value which relates to said predetermined time.

2. The apparatus according to claim 1, wherein said gamma-rays emitted from said radiation source have an energy substantially in the range between 13 Kev to 29 Kev.

3. The apparatus according to claim 1, in which a subtracting circuit is connected between said second counting means and said display means.

4. An apparatus for measuring the sulfur content of hydrocarbons comprising:
   a radiation source for directing gamma-rays upon a hydrocarbon the sulfur content of which is to be measured;
   means for detecting the portion of said gamma-rays which penetrates through said hydrocarbon to be measured and for converting the same into corresponding electrical signals;
   an amplifier coupled to the output side of said detecting means;
   a first gate coupled to output side of said amplifier;
   a first counting means connected to the output side of said first gate for counting the portion of gamma-rays which have penetrated through said hydrocarbon;
   a pulse generator for generating pulses having a constant period;
   a second gate connected to the output side of said pulse generator;
   a second counting means connected to the output side of said second gate for counting the number of pulses generated from said pulse generator;
   means connected to the output side of said second counting means for displaying the sulfur content of said hydrocarbon to be measured;
   a gate control means for controlling said first gate and second gate, the input side of said gate control means being connected to said first counting means and second counting means through respective first switch means and second switch means and the output side of said gate control means being respectively connected to said first gate and second gate and wherein said gate control means controls said first counting means and second counting means through said first gate and second gate in such a manner that said second counting means counts said pulses from said pulse generator until said first counting means counts the portion of gamma-rays which penetrates through said hydrocarbon to be measured up to a calculated value which corresponds to a time which has been preset in said first counting means in accordance with a standard hydrocarbon whose sulfur content is known in order to obtain the sulfur content of the hydrocarbon to be measured with $n$ decimal figures of accuracy, such that the sulfur content of said hydrocarbon to be measured is displayed on said display means when a value which relates to said preset time is subtracted from the value counted by said second counting means.

5. The apparatus according to claim 4, in which a pulse height discriminator is connected between said amplifier and said first gate.

6. The apparatus according to claim 4, wherein said gamma-rays emitted from said radiation source have an energy substantially in the range of 13 Kev to 29 Kev.

* * * * *